US007705500B2

(12) United States Patent
Mills et al.

(10) Patent No.: US 7,705,500 B2
(45) Date of Patent: Apr. 27, 2010

(54) VIBRATION APPARATUS AND MOTOR ASSEMBLY THEREFORE

(75) Inventors: Stephen B. Mills, Atkinson, NH (US); Charles J. Burout, III, Bedford, NH (US)

(73) Assignee: Brookstone Purchasing, Inc., Merrimack, NH (US)

( * ) Notice: Subject to any disclaimer, the term of this patent is extended or adjusted under 35 U.S.C. 154(b) by 339 days.

(21) Appl. No.: 12/014,329

(22) Filed: Jan. 15, 2008

(65) Prior Publication Data

US 2008/0169715 A1 Jul. 17, 2008

Related U.S. Application Data

(60) Provisional application No. 60/881,072, filed on Jan. 17, 2007.

(51) Int. Cl.
*H02K 7/06* (2006.01)

(52) U.S. Cl. .............................. 310/81; 601/49; 601/70

(58) Field of Classification Search ................... 310/81, 310/51, 89; 601/49, 69–70
See application file for complete search history.

(56) References Cited

U.S. PATENT DOCUMENTS

| | | | |
|---|---|---|---|
| 1,970,233 | A | 8/1934 | Hertzberg |
| 2,235,183 | A | 3/1941 | Wettlaufer |
| 2,311,274 | A | 2/1943 | Whitney |
| 2,498,997 | A | 2/1950 | Berthonlin |
| 2,902,993 | A | 9/1959 | Wagner |
| 3,425,266 | A | 2/1969 | Klinger et al. |
| 3,667,453 | A | 6/1972 | Schneck et al. |
| 3,765,407 | A | 10/1973 | Prince |
| 3,883,260 | A | 5/1975 | Heckner |
| 4,570,616 | A | 2/1986 | Kunz et al. |
| 4,709,362 | A | 11/1987 | Cole |
| 4,782,822 | A | 11/1988 | Ricken |
| 5,046,484 | A | 9/1991 | Bassett et al. |
| 5,076,260 | A | 12/1991 | Komatsu |
| 5,273,028 | A | 12/1993 | McLeod et al. |
| 5,443,439 | A | 8/1995 | Ohshita |

(Continued)

FOREIGN PATENT DOCUMENTS

AU 516409 6/1981

(Continued)

OTHER PUBLICATIONS

Power Plate, Technical Specifications, www.powerplate.com, Power Plate North America, Inc., Northbrook, IL.

(Continued)

*Primary Examiner*—Thanh Lam
(74) *Attorney, Agent, or Firm*—Grossman, Tucker, Perreault & Pfleger

(57) ABSTRACT

A vibration apparatus and also a motor assembly are provided to enhance vibrational massage therapy and to improve non-impact exercise. In particular, the motor assembly generates vibrations of differing amplitudes utilizing a single motor to drive a shaft that, in turn, rotates an eccentric weight whose rotational axis is non-coaxial with the shaft's rotational axis. The reversal of the direction in which the motor rotates the shaft changes the amplitude of the resulting vibrations communicated to a platform. Thus, vibrational amplitude most suitable for a particular application or purpose may be selected.

30 Claims, 11 Drawing Sheets

U.S. PATENT DOCUMENTS

| | | | | |
|---|---|---|---|---|
| 5,484,388 | A | 1/1996 | Bassett et al. | |
| 5,665,918 | A | 9/1997 | Takano et al. | |
| 5,666,852 | A | 9/1997 | Musschoot | |
| 5,693,990 | A | 12/1997 | Miyazaki | |
| 5,716,331 | A | 2/1998 | Chang | |
| 5,730,687 | A | 3/1998 | Ledany | |
| 5,818,135 | A | 10/1998 | Riedl et al. | |
| 5,910,123 | A | 6/1999 | Wang | |
| 5,931,286 | A | 8/1999 | Illi | |
| 5,971,901 | A | 10/1999 | Shaw | |
| 6,231,531 | B1 | 5/2001 | Lum et al. | |
| 6,263,750 | B1 | 7/2001 | Maurer et al. | |
| 6,375,630 | B1 | 4/2002 | Cutler et al. | |
| 6,392,328 | B1 | 5/2002 | Ashizawa | |
| 6,394,697 | B1 | 5/2002 | De Boer | |
| 6,440,092 | B1 | 8/2002 | Leventhal et al. | |
| 6,620,117 | B1 | 9/2003 | Johnson et al. | |
| 6,628,798 | B2 | 9/2003 | Teshima et al. | |
| 6,659,918 | B2 | 12/2003 | Schiessl | |
| 7,023,114 | B2 * | 4/2006 | Takagi et al. | 310/81 |
| 7,141,029 | B2 * | 11/2006 | Kim | 601/78 |
| 7,278,976 | B1 | 10/2007 | Chen | |
| 7,525,225 | B2 * | 4/2009 | Uchiumi et al. | 310/81 |
| 7,530,960 | B2 * | 5/2009 | Cook | 601/46 |
| 7,563,235 | B2 * | 7/2009 | van der Meer | 601/70 |
| 7,589,446 | B2 * | 9/2009 | Suzuki et al. | 310/81 |
| 7,619,335 | B2 * | 11/2009 | Suzuki et al. | 310/81 |
| 2003/0083599 | A1 | 5/2003 | Kitov | |
| 2005/0131319 | A1 | 6/2005 | van der Meer | |
| 2006/0068211 | A1 | 3/2006 | Kanakarajan | |
| 2006/0252610 | A1 | 11/2006 | Wilson | |
| 2006/0253053 | A1 | 11/2006 | Koonar | |
| 2007/0239088 | A1 | 10/2007 | Wu | |
| 2008/0132812 | A1 * | 6/2008 | Cook | 601/49 |

FOREIGN PATENT DOCUMENTS

| | | |
|---|---|---|
| DE | 2755075 | 6/1979 |
| DE | 19639477 | 4/1998 |
| FR | 2507111 | 12/1982 |

OTHER PUBLICATIONS

Soloflex, SoloFlex WBV, print advertisement, 2006, Soloflex, Inc., Hillsboro, OR.

Vibraslim, VibraSlim Vibration Machine, 2006, www.myvibraslim.com, VibraSlim Fitness Equipment USA, Scottsdale, AZ.

Power Vibe, Whole Body Vibration by Power Vibe, Leading Experts in the WBV Industry, www.wholebodyvibration.com, 2006-2007, Richardson, TX.

Noblerex, Noblerex K1-K1 Body Vibration Machine, www.noblerex.com, 2005.

Ironman Fitness, Resolution Energize Your Life, sales brochure, Garland, TX.

CBS Sports Store, Health Mark Movin Health, www.cbssportsstore.com, Aug. 17, 2007.

International Search Report and Written Opinion dated Apr. 16, 2008 issued in related International Patent Application No. PCT/US2008/051062.

* cited by examiner

FIG. 12a
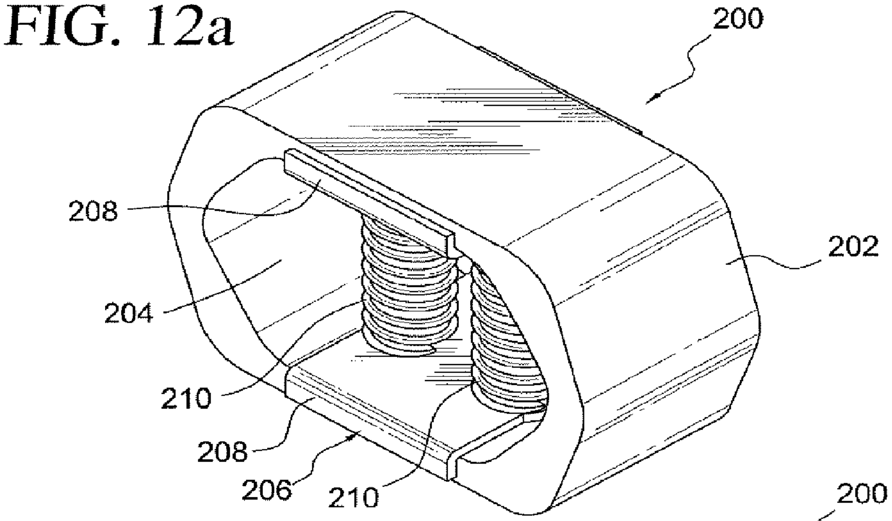
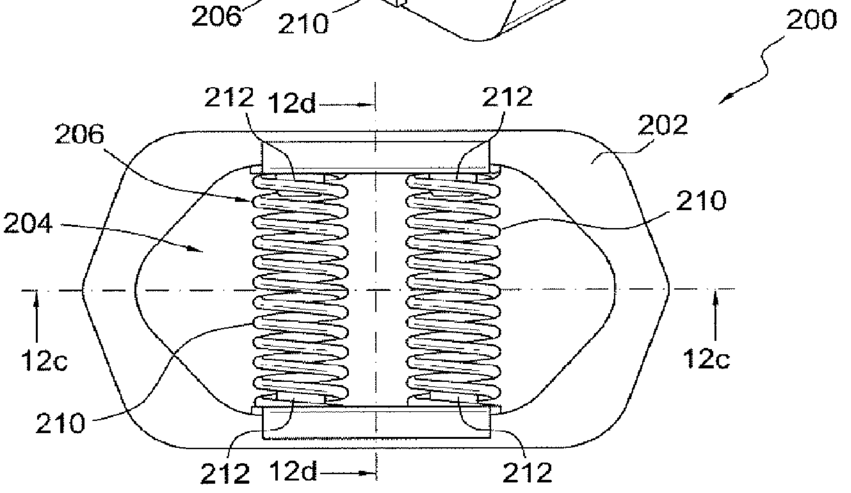
FIG. 12b
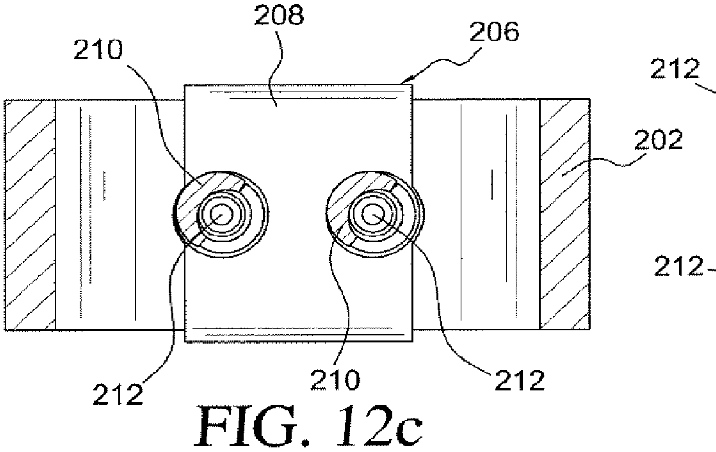
FIG. 12c
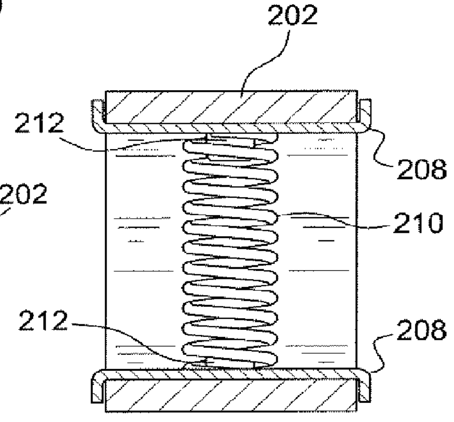
FIG. 12d

VIBRATION APPARATUS AND MOTOR ASSEMBLY THEREFORE

CROSS REFERENCE TO RELATED APPLICATIONS

This application claims priority to U.S. Provisional Application No. 60/881,072 filed Jan. 17, 2007, the contents of which are incorporated herein by reference.

BACKGROUND OF THE INVENTION

1. Field of the Invention

The present invention relates to a vibration apparatus and an associated motor assembly. In particular, the invention relates to an apparatus capable of generating vibrations of various amplitudes at the same frequency or within a defined frequency range. Additionally, the preferred embodiments of the present invention relate to massage and fitness devices that are designed to provide an individual with the benefits associated with vibrational motion such as increased flexibility, increased muscular strength, alleviated muscular pain, reduced muscular strain, and improved blood circulation.

2. Description of the Related Art

The method of communicating vibrations to a plate or platform, by use of a shaft rotationally driven by a motor and use of eccentric weights, is constantly evolving. Generally, all types of vibrational motor assemblies share the same basic structure; namely, a motor rotatably driving a shaft, at least one eccentric weight operably coupled to the rotating shaft, and a substantially rigid plate or platform. Furthermore, traditional applications for vibration plates or platforms include soil compacting, concrete laying, and therapeutic vibrational devices such as massagers and exercise equipment.

SUMMARY OF THE INVENTION

One advantage of the present invention is in providing a motor assembly that generates vibrations at different amplitudes without the need to increase or decrease the amount of the eccentric weight.

Another advantage of the present invention is in providing a platform-type vibration apparatus that operates at different vibrational amplitudes while maintaining substantially the same vibration frequency.

Yet another advantage of the present invention is in providing a motor assembly that vibrates a platform in or along a substantially linear path.

Still another advantage of the present invention is in providing a motor assembly which increases the amplitude of vibrations by reversing the direction in which a motor drives an eccentrically weighted rotary disc.

Yet another advantage of the present invention is to provide a vibration apparatus having a platform for supporting a user's body and a motor assembly that uses only a single motor to provide different levels of vibration thereby avoiding multiple motors that would require phase synchronization in vibrational devices such as massagers or fitness equipment.

Still another advantage of the present invention is to provide a lower cost, lightweight platform-type vibration apparatus capable of effectively providing multiple levels of vibrations.

These and additional advantages of the invention set forth in the following description may be accomplished by a single reversible motor driving an eccentrically weighted rotary disc in conjunction with linear vibration dampeners and isolators. The motor assembly vibrates a plate or platform at various amplitudes by changing the center of gravity of the driven rotary disc by utilizing the inertial effects of the eccentric weight. Through the use of a single motor, the amplitude, frequency, and direction of the generated vibrations can be easily controlled which is advantageous as synchronizing the phases of multiple motors is challenging; particularly, for vibrational massagers and exercisers. Since a single motor assembly experiences minimal operational variability over the life of the motor assembly, the component parts and specifications of the motor assembly can be selected to meet specific vibrational parameters without the necessity of frequent recalibration or resynchronization of motor phases.

BRIEF DESCRIPTION OF THE DRAWINGS

The present invention can be more completely understood by considering the following Description of the Preferred Embodiments and the accompanying figures. In the figures, like numerals in different figures represent the same structural components or elements. The representations in each figure are diagrammatic and are not depicted to actual scale or precise ratios. The proportional relationships between structural components and elements are approximations.

FIGS. 12*a*-12*d* are various views of an alternative embodiment of a vibration dampener.

DESCRIPTION OF THE PREFERRED EMBODIMENTS

According to the present invention, a platform-type vibration apparatus 100 (FIGS. 8-11) and a motor assembly 10 (FIGS. 1-7) are provided. The motor assembly 10 is designed to improve the efficiency and effectiveness of a vibration apparatus such as massage and exercise devices, and in particular, the platform-type vibration apparatus 100 of the present invention. In one embodiment, the motor assembly vibrates a plate or platform in or along a substantially linear path or direction, i.e. single axis of motion. By generating substantially linear vibration, any negative effects that may be caused by undesired tangential or transverse vibration are minimized without adding additional stress upon the mechanical components of the motor assembly thereby maximizing the positive experience of, and beneficial effects on, the user of the vibration apparatus.

Figure 1:
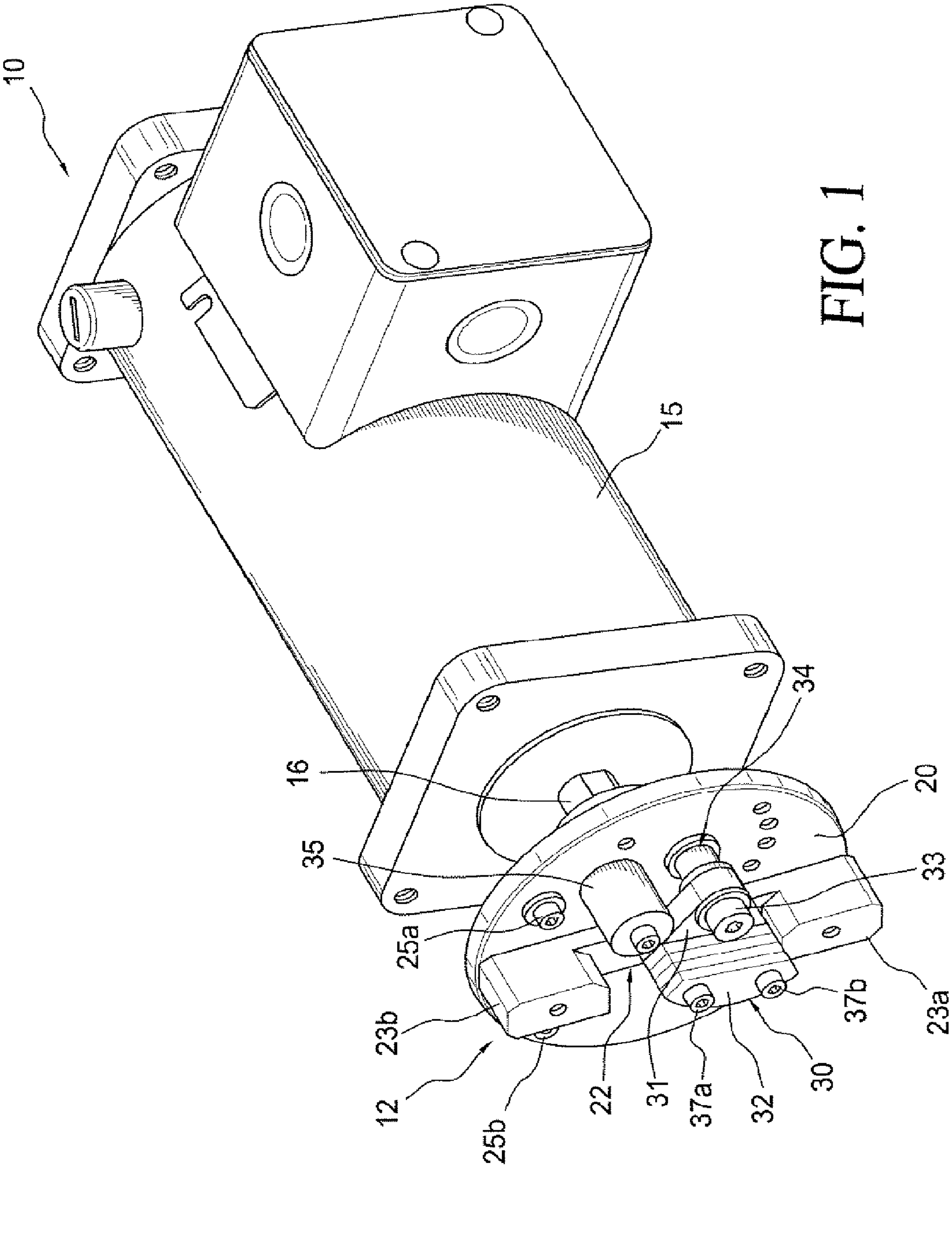
FIG. 1 is a perspective view of one embodiment of a vibrational motor assembly according to the present invention.
Figure 2:
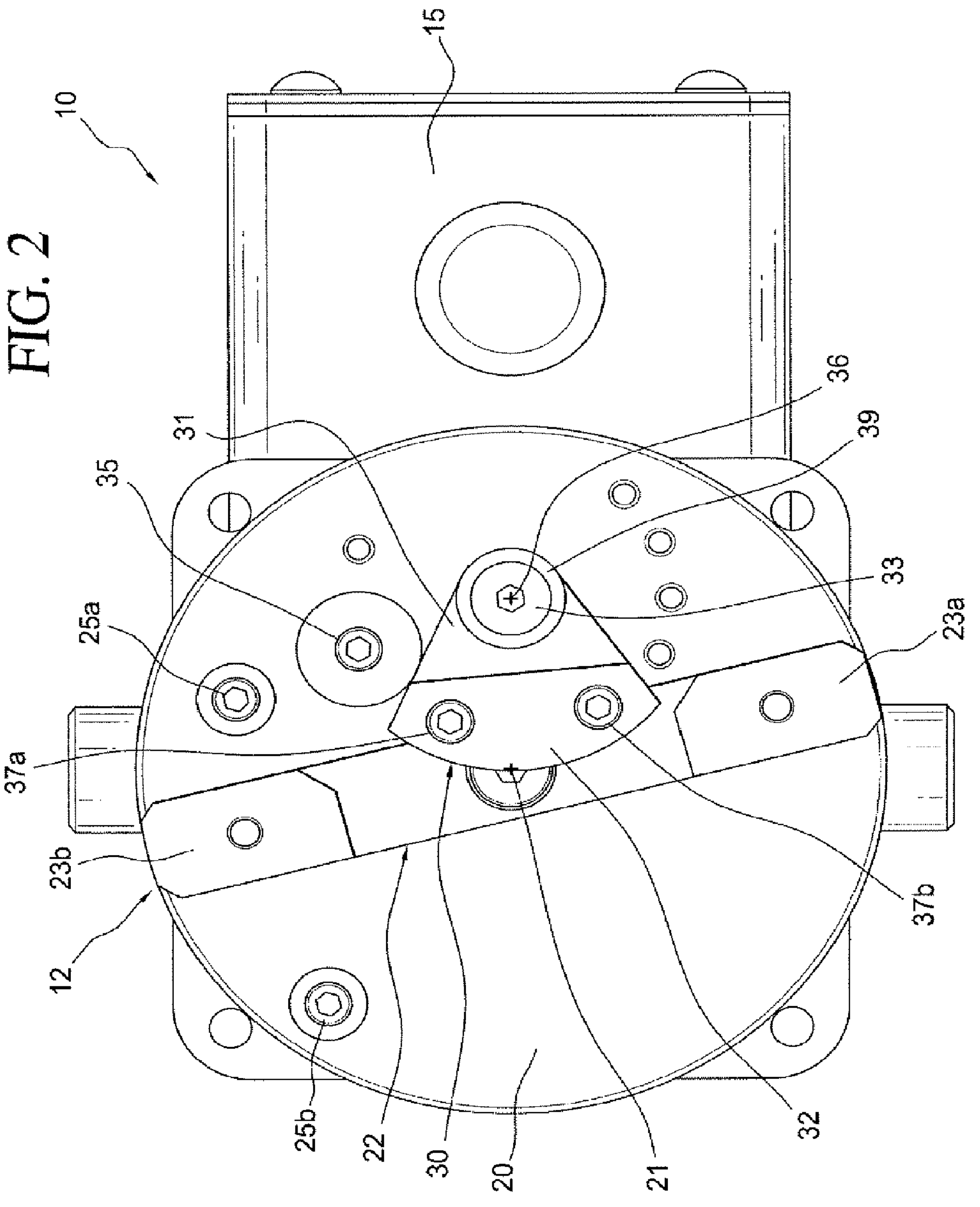
FIG. 2 is a front plan view of the vibrational motor assembly depicted in FIG. 1.
Figure 3:
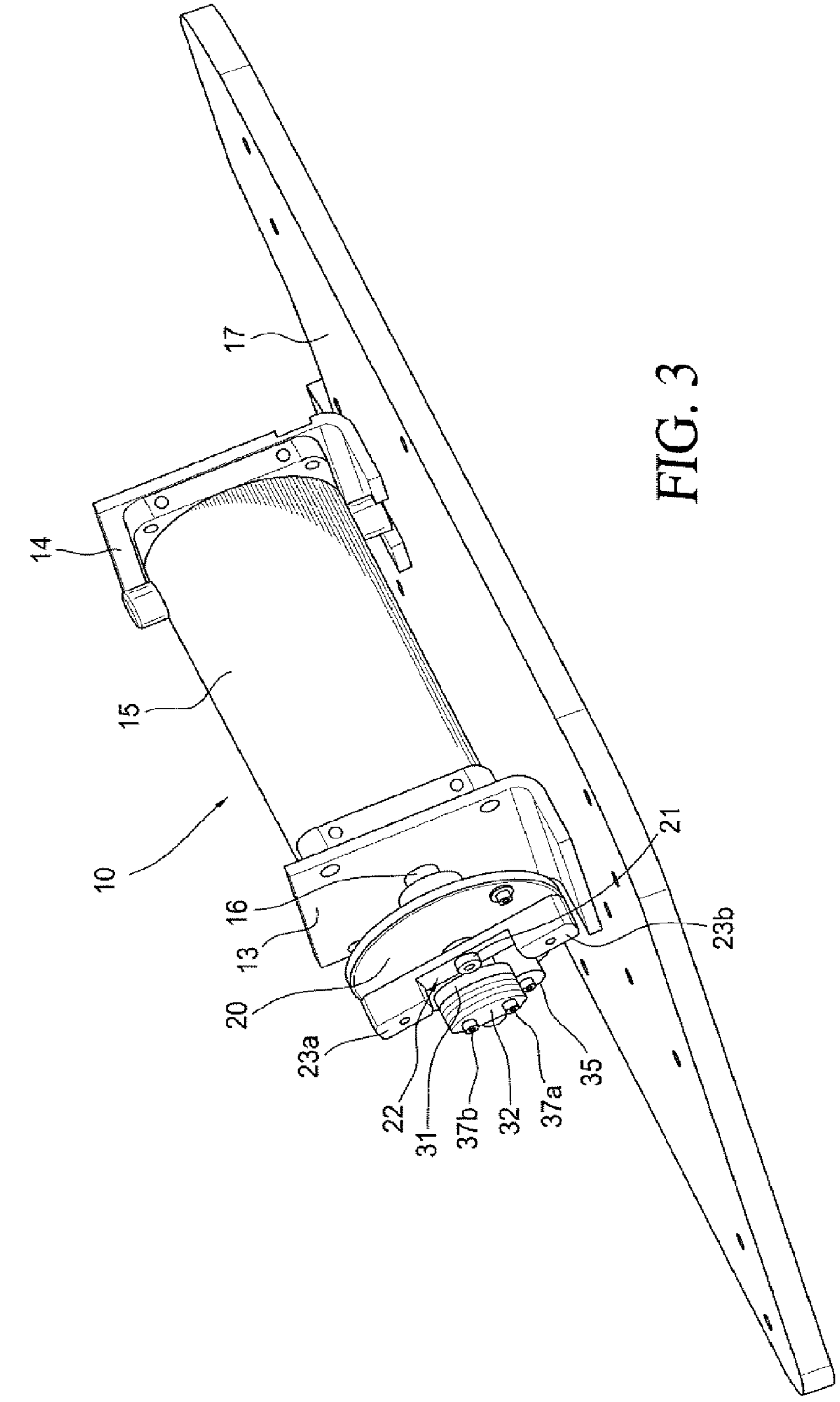
FIG. 3 is a perspective view of the vibrational motor assembly depicted in FIG. 1 attached to a vibration platform via brackets.
Figure 4:
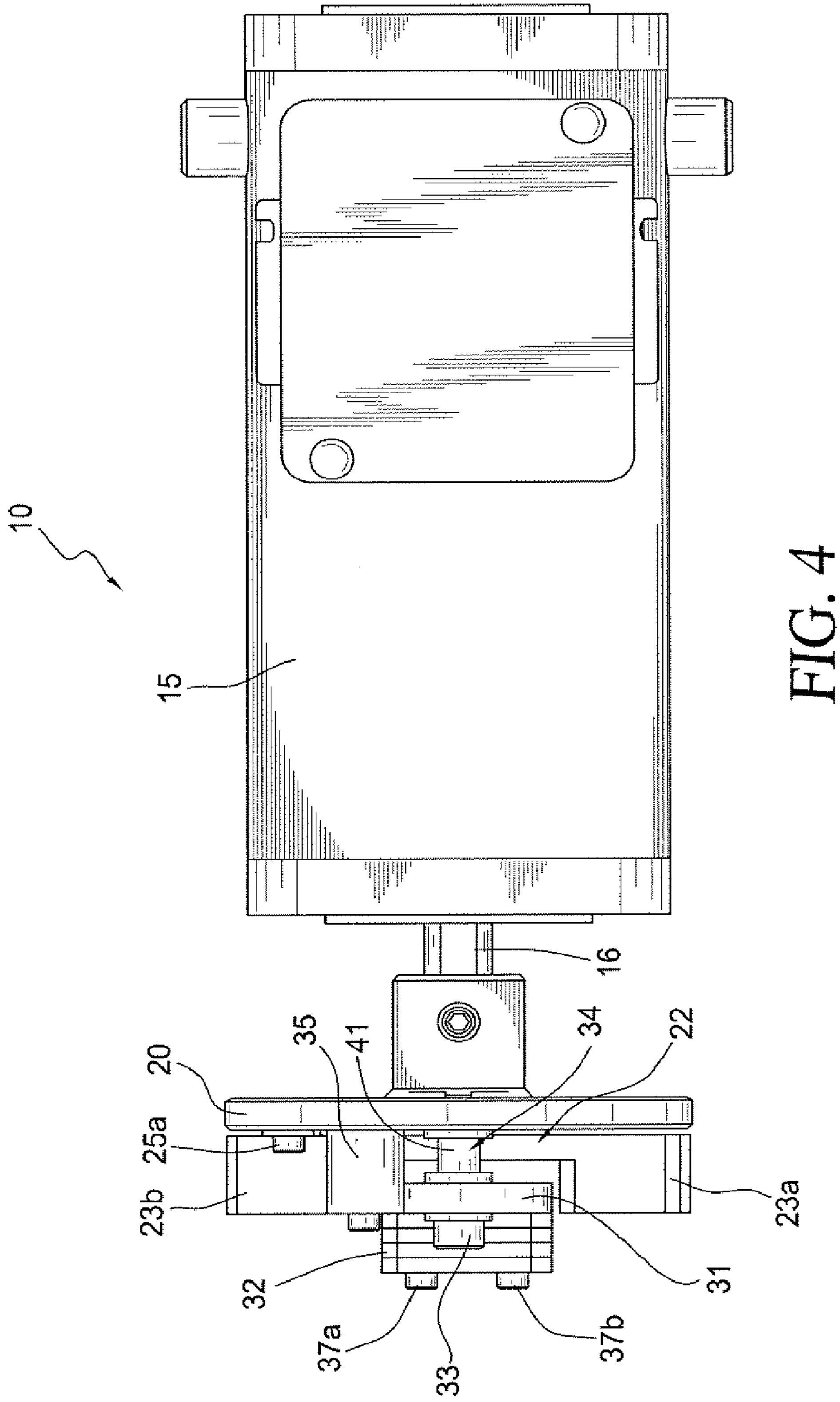
FIG. 4 is a side view of the vibrational motor assembly depicted in FIG. 1.

Referring to FIGS. 1-7, one exemplary embodiment of the present invention includes motor assembly 10 suitable for mounting on, or attachment to, a plate or platform 17 (FIG. 3). As shown in detail in FIGS. 1-4, a motor 15 is capable of rotatably driving a shaft 16 in either a clockwise or a counterclockwise direction. A rotary support or disc 20 is operably connected, and preferably rigidly connected, to the shaft 16 at the center axis or point 21 of the rotary disc 20. Thus, the axis of rotation of the rotary disc 20 and of the shaft 16 are coaxial.

An eccentric weight 30 is pivotally attached to, or mounted on, the rotary disc 20 by means of a shoulder screw 33 and a torsion spring assembly 34 which, in the present embodiment, includes a bushing sleeve 41 encasing a torsion spring between the rotary disc 20 and the eccentric weight 30. The bushing sleeve 41 of the torsion spring assembly 34 may preferably be manufactured from a plastic or metallic material. The torsion spring assembly 34 ensures a gap is maintained between the eccentric weight 30 and the rotary disc 20 and minimizes friction between the eccentric weight 30 and the rotary disc 20 to permit smooth pivoting of eccentric weight 30 relative to rotary disc 20. In addition, the torsion spring assembly 34 applies a biasing force on the eccentric weight 30 to bias the weight 30 in the clockwise direction to the position shown in FIGS. 1 and 2 toward a bumper 35. Thus, the eccentric weight 30 can pivot about its pivot axis or point 36 while subject to a biasing force of the torsion spring assembly 34, and inertial effects on the eccentric weight 30 are not substantially effected by surface friction between the eccentric weight 30 and the rotary disc 20. In the exemplary embodiment, the pivot axis 36 of the eccentric weight 30 is parallel to the axis of rotation of the rotary disc 20 and shaft 16. Importantly, in order to increase the magnitude of the centrifugal force of the eccentric weight 30, the pivot axis 36 of the eccentric weight 30 is offset a predetermined spaced distance from, and therefore not coaxial or coincident with, the axis of rotation of the rotary disc 20 and the shaft 16.

Figure 5:
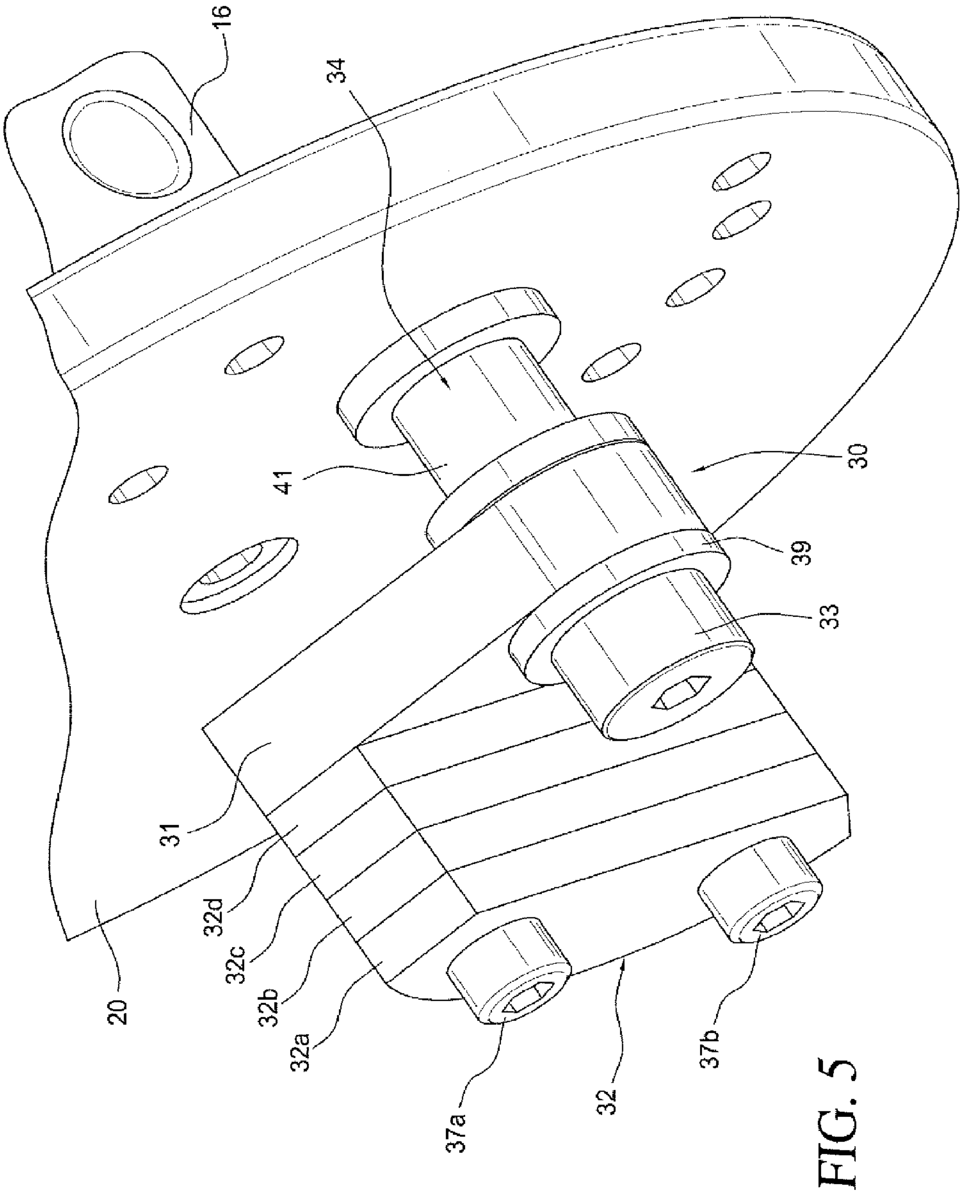
FIG. 5 is an enlarged frontal perspective view of the eccentric weight and rotary disc depicted in FIG. 1.

Referring to FIGS. 2 and 5, in one embodiment, a washer 39, preferably made of rubber or a similar material, is placed between the shoulder screw 33 and the eccentric weight 30 in order to further reduce the frictional forces acting on the eccentric weight 30. In a preferred embodiment, the eccentric weight 30 includes a primary eccentric weight 31 and a secondary eccentric weight 32 mounted on the primary eccentric weight 31 and secured using, for example, two screws 37*a* and 37*b*. However, the eccentric weight 30 may instead be a integrated one-piece uniform or graduated mass or body.

An elongated movable stop or swing arm 22 is moveably attached to the rotary disc 20 at the center axis 21 and mounted for substantially unrestricted pivoting movement or rotation relative to the rotary disc 20 about the center axis 21 of the rotary disc 20. Moreover, swing arm 22 is balanced so that its center of gravity is positioned at center axis 21. Additionally, the swing arm 22 includes raised sections 23*a* and 23*b* positioned at respective outer ends of the arm 22. Each raised section 23*a*, 23*b* extends outward away from rotary disc 20 a sufficient distance for contact with eccentric weight 30 as discussed hereinbelow. Swing arm 22 also includes a channel 43 extending between raised sections 23*a*, 23*b* to permit overlapping rotation or pivoting of swing arm 22 and eccentric weight 30 and thus positioning of weight 30 in channel 43. Two stoppers 25*a* and 25*b*, preferably manufactured from rubber or a similar material, are mounted to the rotary disc 20 on either side of one end of the swing arm 22 such that the rotational motion of swing arm 22 relative to the rotary disc 20 is limited. As an alternative to stoppers 25*a* and 25*b*, other methods might be utilized to restrict the rotational motion of the swing arm 22 relative to the rotary disc 20 such as providing contours on the top surface of the rotary disc 20.

As shown in detail in FIG. 2, the bumper 35, preferably made of rubber or similar material, is affixed to the rotary disc 20 on the same side of the swing arm 22 as the eccentric weight 30 and bumper 25*a*. As noted, the eccentric weight 30 is biased by the torsion spring assembly 34 so that it abuts a side of the bumper 35 when the rotary disc 20 is stationary.

As illustrated in FIG. 3, the motor assembly 10 is mounted to a plate or platform 17 with a front bracket 13 and a rear bracket 14. While in a preferred embodiment, the motor assembly 10 is attached to the plate or platform 17 with brackets 13 and 14, the motor assembly 10 can be affixed to the plate or platform by alternate means such as a housing enclosing the motor 15 which is then attached to the plate or platform 17. Additionally, more or less than two brackets 13 and 14 may be used to attach the motor assembly 10 or motor 15 to the plate or platform 17.

As shown in FIG. 5, the secondary eccentric weight 32 may be comprised of four separate layers 32*a*, 32*b*, 32*c*, and 32*d* stacked on top of one another. All four separate layers 32*a*, 32*b*, 32*c*, and 32*d* are attached to the primary eccentric weight 31 with screws 37*a* and 37*b*. The four separate layers 32*a*, 32*b*, 32*c*, and 32*d* may each weigh the same amount or different amounts. In one preferred embodiment, each of the four separate layers 32*a*, 32*b*, 32*c*, and 32*d* has a uniform mass distribution; however, layers with non-uniform mass distributions may also be used. Moreover, the present invention is not limited to embodiments that include multiple layers in the secondary eccentric weight 32 as the weight 32 may be a single one-piece body. In addition, both primary eccentric weight 31 and secondary eccentric weight 32 may have different shapes than shown in the present embodiment.

As can be appreciated, as the mass of the secondary eccentric weight 32 is increased, the center of gravity of the eccentric weight 30 is positioned farther away from the pivot axis 36 so that vibration generated by the rotation of the rotary disc 20 increases. In a preferred embodiment, the pivot axis 36 is coaxial with the torsion spring assembly 34 and the shoulder screw 33 that connects the eccentric weight 30 and the torsion spring assembly 34 to the rotary disc 20.

Figure 6:
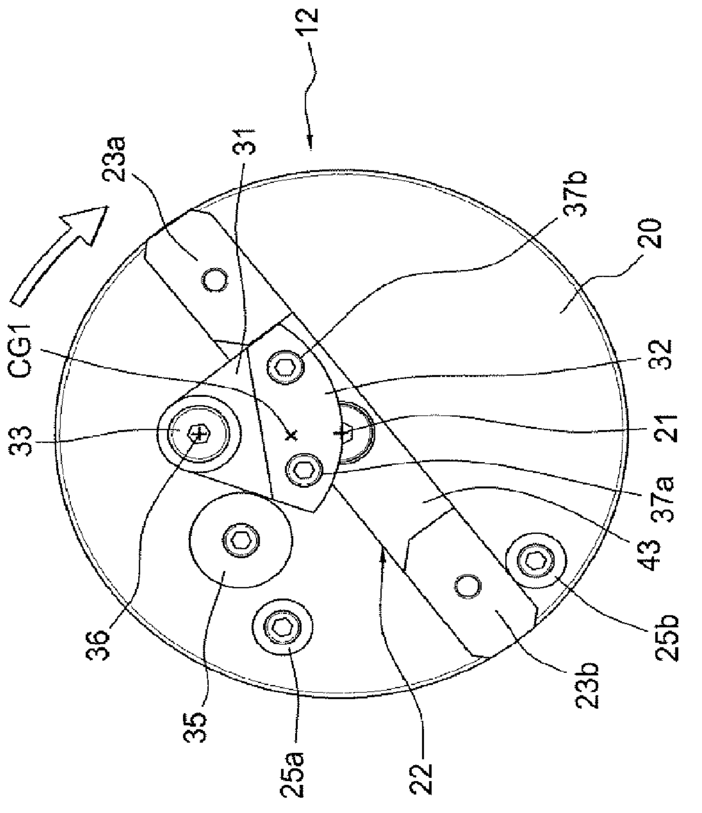
FIG. 6 is a front plan view of the vibrational motor assembly depicted in FIG. 1 with the swing arm and eccentric weight in the low vibration amplitude configuration, the arrow identifying the direction of rotation for generating the low amplitude vibrations.

In the illustrated embodiment of the present invention, the motor 15 drives the shaft 16 to rotate the rotary disc 20 in a first rotational direction, i.e. in a clockwise direction in FIG. 6. When the rotary disc 20 rotates in a clockwise direction, the swing arm 22 moves into a first position in which the right-side raised section 23*b* of the swing arm 22 comes into contact with the first stopper 25*b* as a result of the inertia of the swing arm 22. In the first position, the eccentric weight 30 is positioned in an inner position in contact with the bumper 35 and with the inner edge of the left-side raised section 23*a* of the swing arm 22. Hence, the movement of the eccentric weight 30 about the pivot axis 36 is restricted. In this position, swing arm 22 thus functions to maintain eccentric weight 30 against bumper 35. When the eccentric weight 30 is in the radially inward, or inner, position shown in FIG. 6, the center of gravity CG1 of the rotational system 12, comprised of the rotary disc 20, the swing arm 22, the stoppers 25*a* and 25*b*, the eccentric weight 30, the bumper 35, and the torsion spring assembly 34, is near, i.e., spaced a small distance from, the center axis 21 of the rotary disc 20, causing the motor assembly 10 to transmit relatively low amplitude vibrations to the plate or platform 17.

Figure 7:
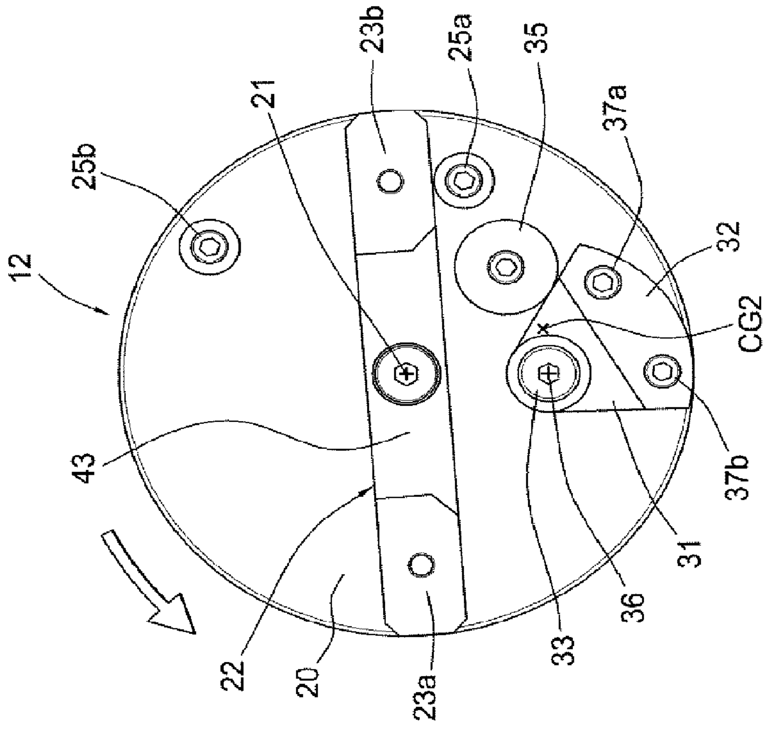
FIG. 7 is a front plan view of the vibrational motor assembly depicted in FIG. 1 with the swing arm and eccentric weight in the high vibration amplitude configuration, the arrow identifying the direction of rotation for generating the high amplitude vibrations.

Alternately, FIG. 7 shows the motor 15 driving the shaft 16 to rotate the rotary disc 20 in a second rotational direction, i.e. in a counterclockwise direction in the illustration shown. When the rotary disc 20 rotates in a counterclockwise direction, the swing arm 22 moves, i.e., pivots or rotates clockwise, into a second position in which the right-side raised section 23*b* of the swing arm 22 comes into contact with the second stopper 25*a* as a result of the inertia of the swing arm 22. Thus left-side raised section 23*a* moves away from abutment with eccentric weight 30 creating a space for eccentric weight 30 to pivot into an outer position. Centrifugal forces act on the eccentric weight 30 due to the rotation of the rotary disc 20 in a counterclockwise direction, and the inertia of the eccentric weight 30 overcomes the bias of the torsion spring assembly 34 so that the eccentric weight 30 pivots radially outwardly away from the swing arm 22 to abut the bumper 35 in the manner shown in FIG. 7. When the eccentric weight 30 pivots radially outwardly away from the swing arm 22 to the position shown, the center of gravity of the rotational system 12 moves away from center axis 21 to the position CG2 and therefore is positioned closer to the periphery of the rotary disc 20. With CG2 positioned farther away from center axis 21 than CG1, the motor assembly 10 transmits vibrations to the plate or platform 17 that are relatively larger in amplitude than the vibration generated with the center of gravity CG1 of the rotational system 12 near the center axis 21 When reversing rotation of rotary disc 20 back to clockwise rotation, eccentric weight 30 pivots clockwise back into the inner position shown in FIG. 6 and torsion spring assembly 34 maintains eccentric weight 30 against bumper 35 until swing arm 22 moves into abutting position against eccentric weight 30.

Figure 8:
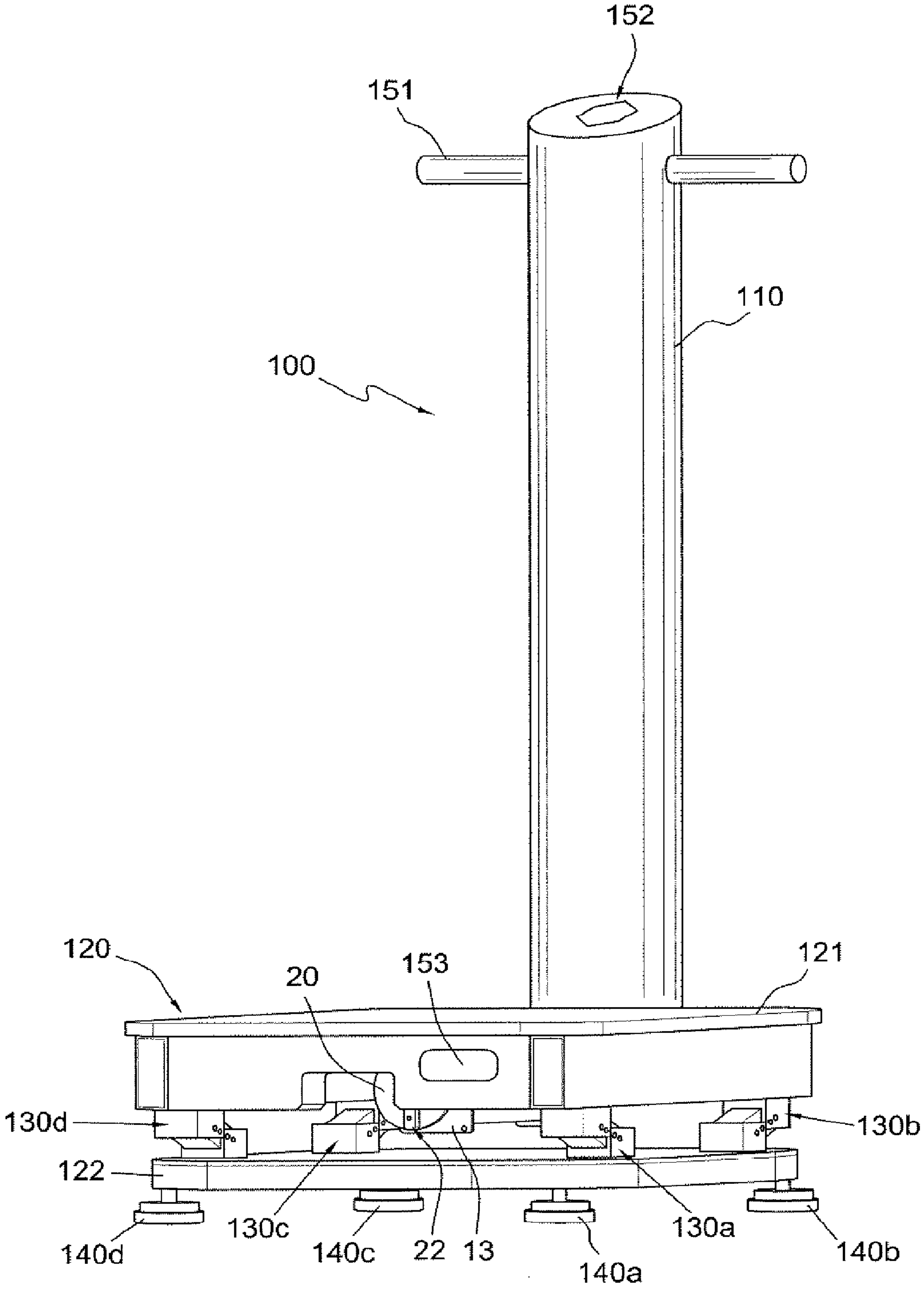
FIG. 8 is a frontal perspective view of one embodiment of a vibration exerciser according to the present invention.

FIGS. 8-11 show a vibration apparatus 100 suitable for use as a massager or a component of an exercise and fitness apparatus which utilizes the motor assembly as described above. Note the apparatus 100 is shown without a housing or enclosure for the vibration base assembly 120. An elongated vertical stem 110, having a longitudinal axis 111, extends generally vertically from the vibration base assembly 120. Through the use of a user console/display 152 (which is schematically shown in FIG. 8), preferably located at the top, or upper portion, of the vertical stem 110, a user can select certain parameters such as vibrational frequency and time duration of vibrational treatment, or can monitor biometrics such as heart rate and calories burned. Importantly, the console 152 also permits the user to select from two vibration intensity levels, e.g. low or high, corresponding to the two center of gravities CG1 and CG2. If the user inputs a low level, then the motor assembly is driven in a rotational direction (clockwise in FIG. 6) to cause eccentric weight 30 to move to the inner position. If the user inputs a high level, then the motor assembly is driven in an opposite rotational direction (counterclockwise in FIG. 7) to cause eccentric weight 30 to move to the outer position. Of course the apparatus also includes the appropriate electronics, such as a motor drive, controller and programmable chip, for receiving signals from console 152 and communicating with the motor assembly 10 to effectively operate the vibration apparatus. The motor 15 receives AC power from a 110V or 220V power outlet, through a power inlet/switch assembly and a power regulator.

In a preferred embodiment, at least one handle 151 is located at or near the top of the vertical stem 110, and the handle 151 may contain a heart rate sensor. Moreover, the external surface of the vibration base assembly 120 may include a display 153 so that users can view information, time remaining for example, when the user console 152 is not easily viewable such as when the user is not in an upright or standing position.

Figure 9:
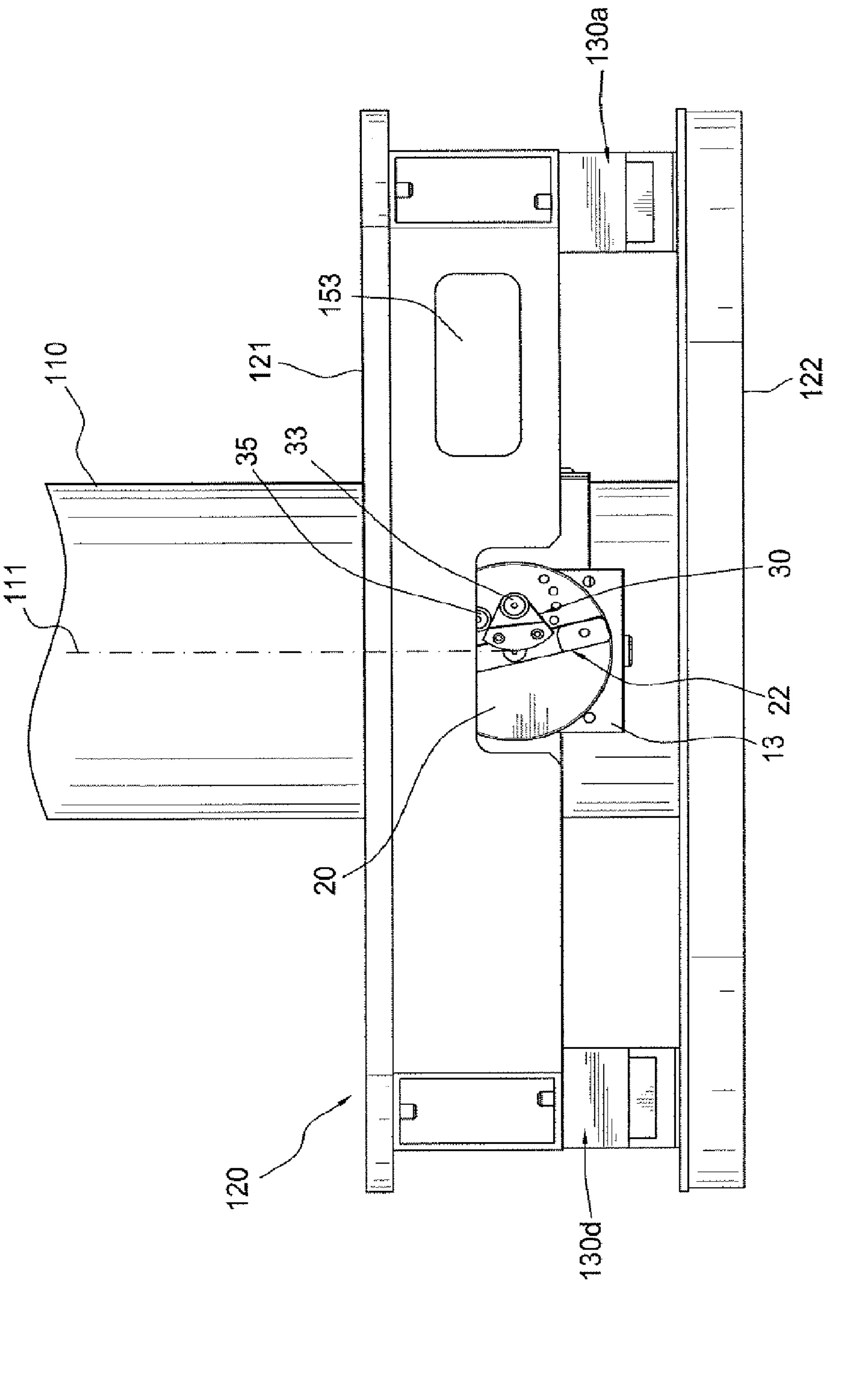
FIG. 9 is an enlarged frontal perspective view of the base of the vibration exerciser depicted in FIG. 8.
Figure 10:
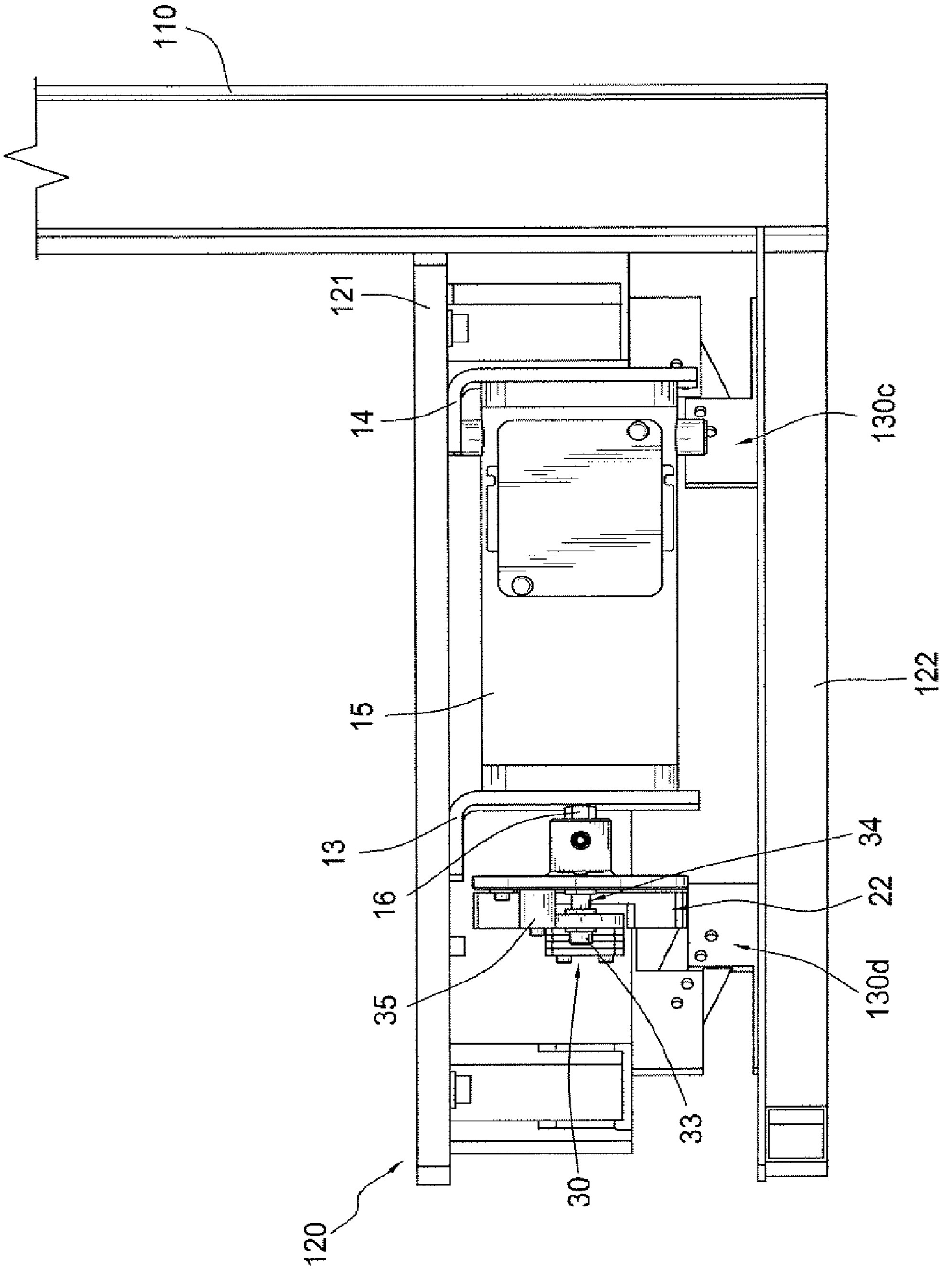
FIG. 10 is a side partial cross sectional view of the base of the vibration exerciser depicted in FIG. 8.
Figure 11:
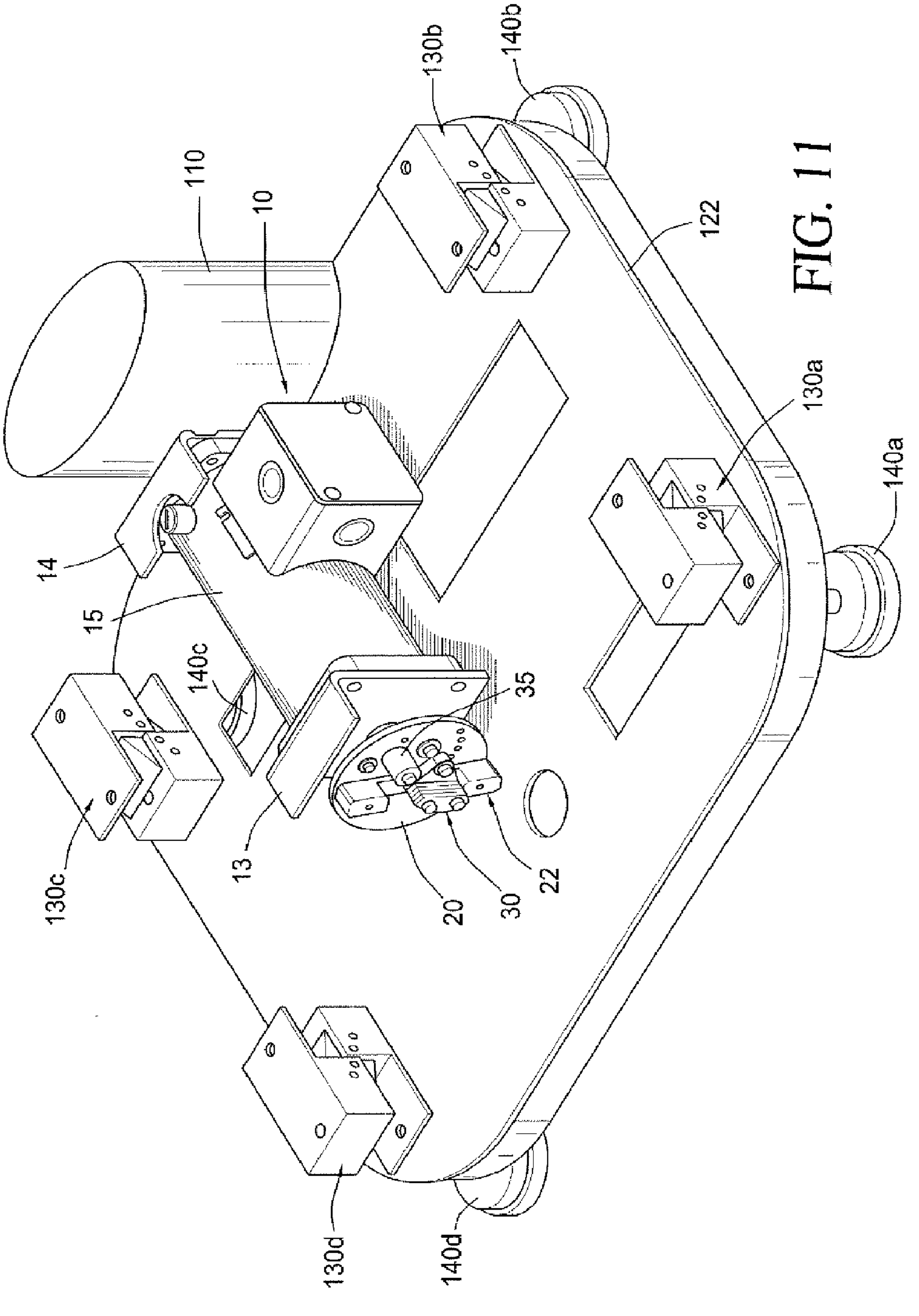
FIG. 11 is a perspective view of the base of the vibration exerciser depicted in FIG. 8 without the platform.

The vibration base assembly 120 includes a vibration platform or top plate 121, and a base or bottom plate 122. The motor assembly 10 is mounted to the underside of the vibration platform 121 by means of a front bracket 13 and a rear bracket 14, for example, in the manner shown and discussed above relative to FIG. 3. As shown in FIGS. 9 and 11, preferably motor assembly 10 is mounted with the center axis 21 positioned in alignment, i.e., in a common vertical plane, with the longitudinal axis 111 of vertical stem 110. Although the vibration platform 121 and the base plate 122 are illustrated in FIGS. 8, 9, and 10 as being substantially the same dimensions, either the vibration platform 121 or the base plate 122 may be smaller than the other in other implementations. In one embodiment as shown in FIG. 8, leveler feet 140*a*, 140*b*, 140*c*, and 140*d* are attached to the bottom surface of the base plate 122 at each of the four corners of the base plate 122 with screws so that the height of the leveler feet 140*a*, 140*b*, 140*c*, and 140*d* can be individually adjusted in order to accommodate for an uneven floor or ground surface.

In one embodiment, the vibration platform 121 and the base plate 122 are connected to each other by vibration dampeners 130*a*, 130*b*, 130*c*, and 130*d* located at each of the four corners of the vibration platform 121 and the base plate 122. Additionally, in a preferred embodiment, the vibration dampeners 130*a*, 130*b*, 130*c*, and 130*d* function to substantially eliminate vibrational components parallel to the plane in which large surface area of the vibration platform 121 lies such that the primary direction of movement and the largest vibrations (amplitudes) produced by the vibration apparatus 100 are parallel to the longitudinal axis of the vertical stem 110, that is, substantially vertical thereby enhancing the experience of the user. The vibration dampeners 130*a*, 130*b*, 130*c*, and 130*d* may be selected based on the expected range of amplitudes of the vibration, and be designed to handle the expected vertical loads. In addition to isolating the vertical component of the vibrations, in preferred embodiments, the vibration dampeners 130*a*, 130*b*, 130*c*, and 130*d* also help reduce the noise emanating or escaping from the vibration base assembly 120 and extends the life of the vibration apparatus 100, including the life of the motor assembly 10.

Referring to FIGS. 12*a*-12*d*, an alternative vibration dampener 200 includes an outer rubber shell 202 having an inner cavity 204, and a mechanical support 206 mounted in cavity 204. Mechanical support 206 includes plates 208 positioned on opposite sides of shell 202 and two coil springs 210 extending vertically between the plates 208 parallel to one another. Spring retainers 212 extend from each plate to secure the ends of each spring 210. Dampener 200 optimally minimizes nonvertical vibration to more effectively translate the vibrational energy of the apparatus into usable vertical vibration for the user's benefit.

The preceding examples are not intended to limit the breadth of the present invention disclosed in this application. Additional embodiments are disclosed in the following claims. Individuals skilled in the art will appreciate and recognize that a variety of alternative methods and embodiments exist given the above teachings. Therefore, the present invention may be practiced, consistent with the scope of the claims, in manners other than those means explicitly described.

We claim:

1. A vibrational motor assembly, comprising:

a shaft having an axis of rotation;

a motor adapted to rotationally drive said shaft in a first rotational direction and in an opposite second rotational direction about said axis of rotation;

a support connected to said shaft for rotation with said shaft; and a weight pivotably mounted on said support for pivotal movement relative to said support about a pivot axis to generate vibration, said pivot axis being positioned a spaced distance from said axis of rotation, wherein said motor assembly generates vibration having a first vibration amplitude when said shaft rotates in said first rotational direction, and generates vibration having a second vibration amplitude when said shaft rotates in said second rotational direction.

2. The assembly of claim 1, wherein said weight pivots between a first position creating a first center of gravity spaced a predetermined distance from said axis of rotation and a second position creating a second center of gravity a second spaced distance from said axis of rotation, said second spaced distance being greater than said first spaced distance.

3. The assembly of claim 1, further including a bumper mounted on said support for abutment by said weight in both said first and said second positions.

4. The assembly of claim 3, further including a movable stop mounted for pivotal movement about said axis of rotation, said weight positioned in abutment against said movable stop and said bumper when in said first position.

5. The assembly of claim 1, further including a bumper mounted on said support for abutment by said weight, wherein said weight is biased into abutment against said bumper.

6. The assembly of claim 1, further including a movable stop mounted adjacent said support for rotation about said axis of rotation.

7. The assembly of claim 6 wherein said movable stop is moveable between a first position spaced from said weight and a second position in abutment against said weight.

8. The assembly of claim 6, wherein said weight is pivotably mounted on said support with a torsion spring assembly to bias said weight in one direction.

9. The assembly of claim 7, wherein said movable stop has a raised section for abutment by said weight.

10. The assembly of claim 5 wherein said movable stop moves into said first position when said shaft rotates in said first rotational direction and moves into said second position when said shaft rotates in said second rotational direction.

11. The assembly of claim 1, further comprising a first plate, at least one bracket connecting said first plate to said motor to communicate said generated vibration to said first plate, a second plate, and at least one damper connecting said first plate to said second plate.

12. The assembly of claim 1, wherein said vibration generated by said motor assembly is substantially linear along a single axis.

13. A vibrational motor assembly, comprising:

a shaft having an axis of rotation;

a motor adapted to rotationally drive said shaft in a first rotational direction and in an opposite second rotational direction about said axis of rotation;

a support connected to said shaft for rotation with said shaft;

a weight pivotally mounted on said support for pivotal movement relative to said support about a pivot axis to generate vibration; and a movable stop mounted adjacent said support for rotation about said axis of rotation, said movable stop having a center of gravity positioned at said axis of rotation.

14. The assembly of claim 13, further including a bumper mounted on said support for abutment by said weight, wherein said weight is positioned in abutment against said movable stop and said bumper when in a first position.

15. The assembly of claim 13, further including a bumper mounted on said support for abutment by said weight, wherein said weight is biased into abutment against said bumper.

16. The assembly of claim 13 wherein said movable stop is moveable between a first position spaced from said weight and a second position in abutment against said weight.

17. A vibration apparatus comprising:

a base having a top plate and a bottom plate;

an elongated stem extending from said base, said elongated stem having an upper section;

a handle attached to said upper section of said elongated stem;

a motor operably connected to said top plate;

a shaft rotationally driven by said motor, said motor being adapted to drive said shaft in a first rotational direction and in an opposite second rotational direction;

a support connected to said shaft for rotation with said shaft; and a weight pivotally mounted on said support for pivotal movement relative to said support about a pivot axis to generate vibration, said pivot axis being positioned a spaced distance from said axis of rotation.

18. The apparatus of claim 17, wherein said weight pivots between a first position creating a first center of gravity spaced a predetermined distance from said axis of rotation and a second position creating a second center of gravity a second spaced distance from said axis of rotation, said second spaced distance being greater than said first spaced distance.

19. The assembly of claim 17, further including a bumper mounted on said support for abutment by said weight in both said first and said second positions.

20. The apparatus of claim 19, further including a movable stop mounted for pivotal movement about said axis of rotation, said weight positioned in abutment against said movable stop and said bumper when in said first position.

21. The apparatus of claim 17, further including a bumper mounted on said support for abutment by said weight, wherein said weight is biased into abutment against said bumper.

22. The apparatus of claim 17, further including a movable stop mounted adjacent said support for rotation about said axis of rotation.

23. The apparatus of claim 22 wherein said movable stop is moveable between a first position spaced from said weight and a second position in abutment against said weight.

24. The apparatus of claim 22, wherein said weight is pivotally mounted on said support with a torsion spring assembly to bias said weight in one direction.

25. The apparatus of claim 22, wherein said movable stop has a raised section for abutment by said weight.

26. The apparatus of claim 22, wherein said movable stop moves into said first position when said shaft rotates in said first rotational direction and moves into said second position when said shaft rotates in said second rotational direction.

27. The apparatus of claim 17, wherein said motor assembly generates vibration having a first vibration amplitude when said shaft rotates in said first rotational direction, and generates vibration having a second vibration amplitude when said shaft rotates in said second rotational direction.

28. The apparatus of claim 17, further comprising at least one bracket connecting said motor to said top plate to communicate said generated vibration to said top plate, and at least one dampener positioned between said top and said bottom plates.

29. The apparatus of 17, wherein said vibration generated by said motor assembly is substantially linear along a single axis.

30. The apparatus of claim 17, further comprising a display on a surface of said base, said display positioned between said tip and said bottom plates.

* * * * *